Nov. 21, 1939.  E. J. HIRVONEN  2,181,055
BORING MACHINE
Filed Aug. 31, 1936  5 Sheets-Sheet 1
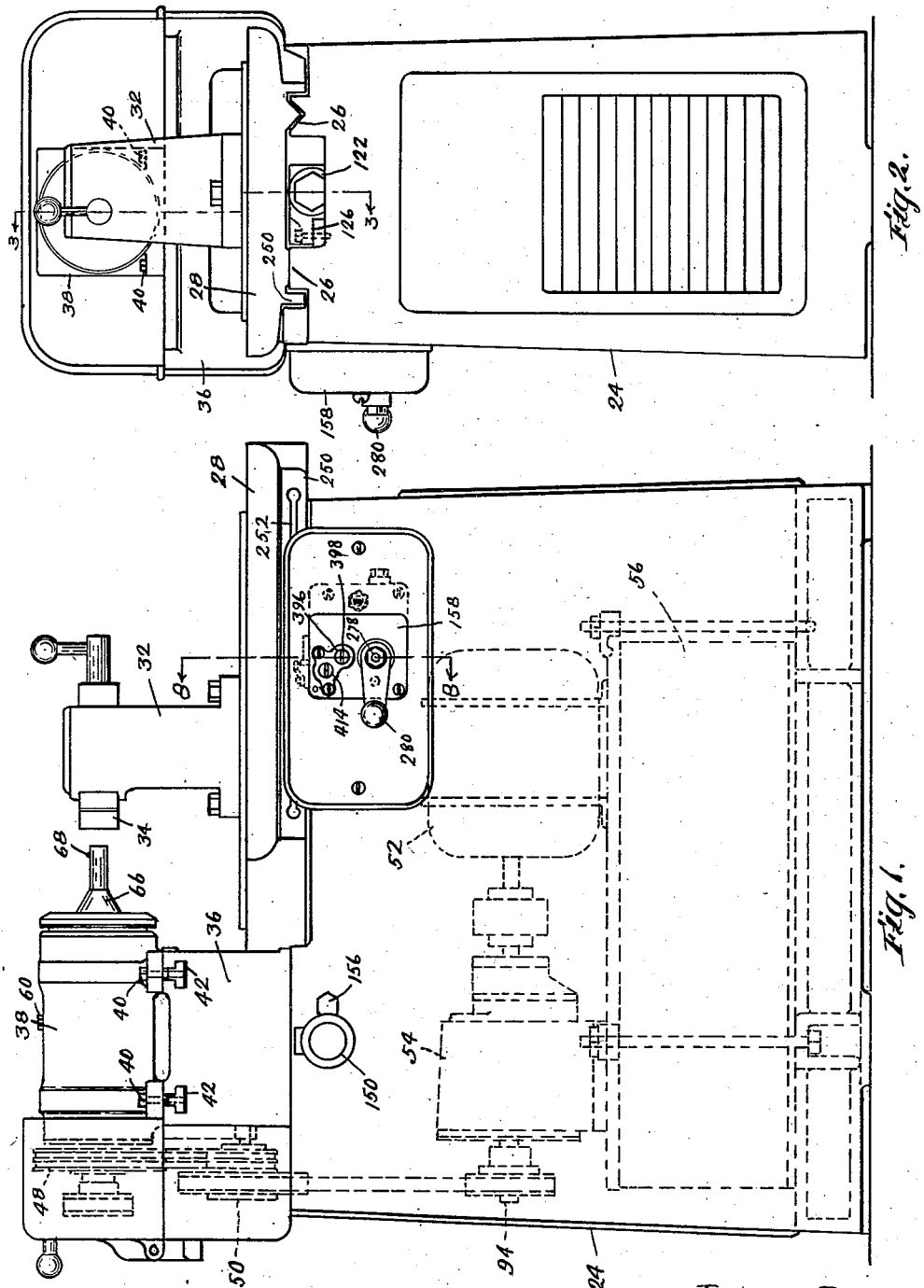

Nov. 21, 1939.  E. J. HIRVONEN  2,181,055
BORING MACHINE
Filed Aug. 31, 1936  5 Sheets-Sheet 2
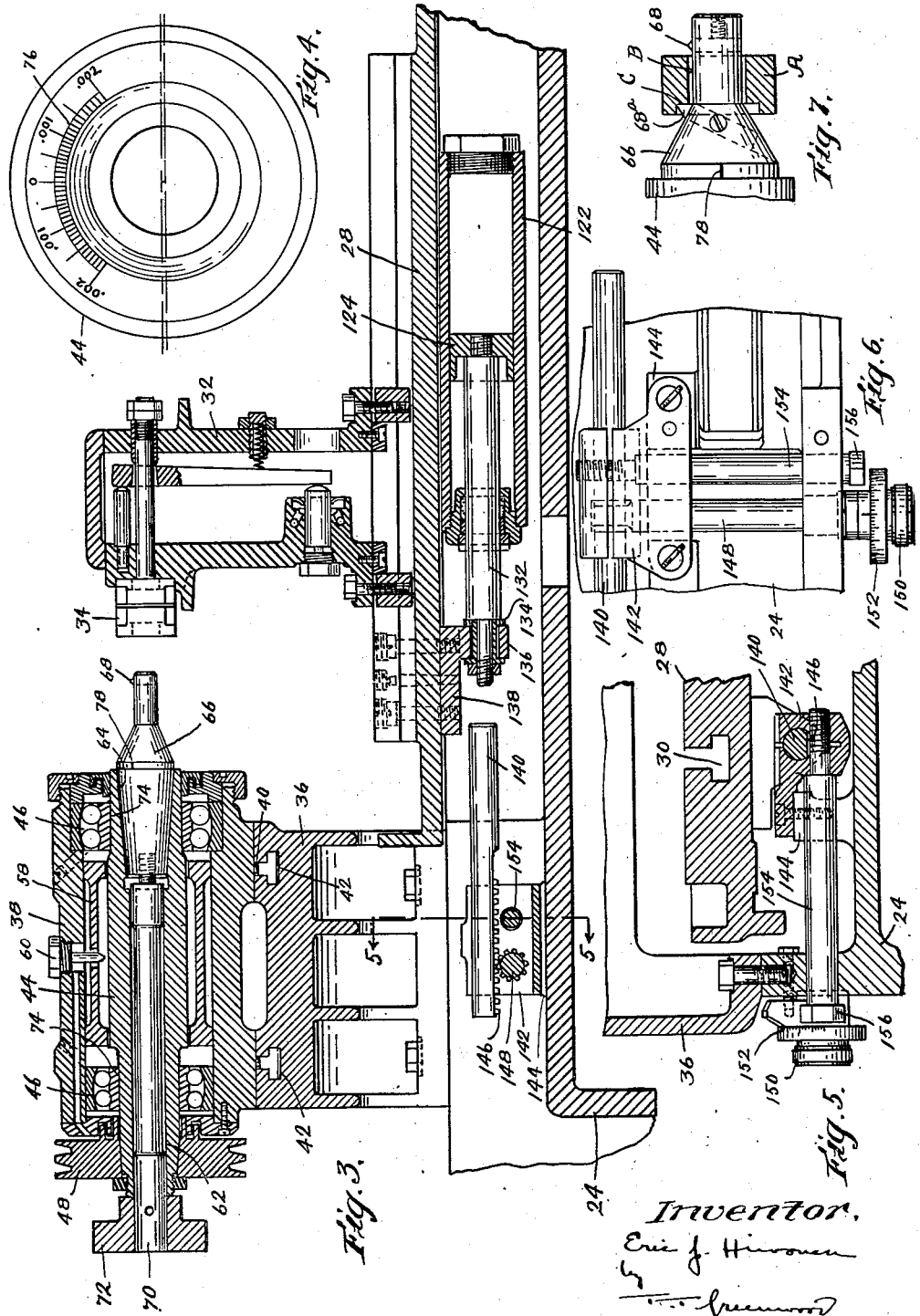
Inventor.
Eric J. Hirvonen

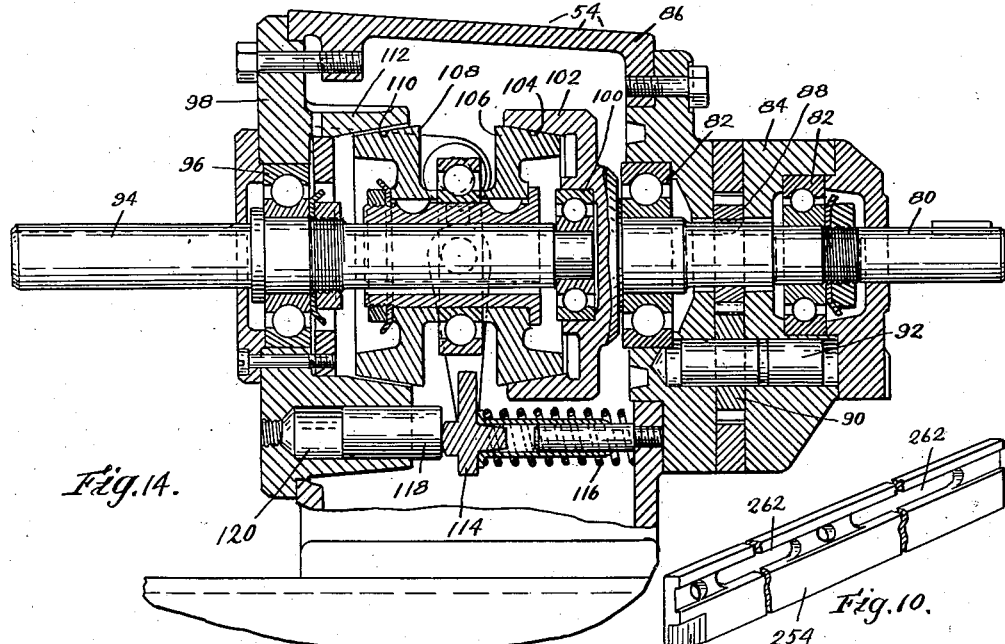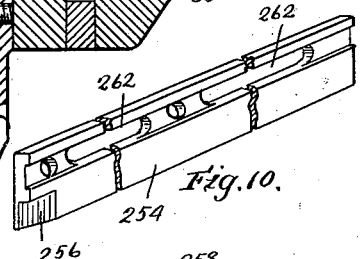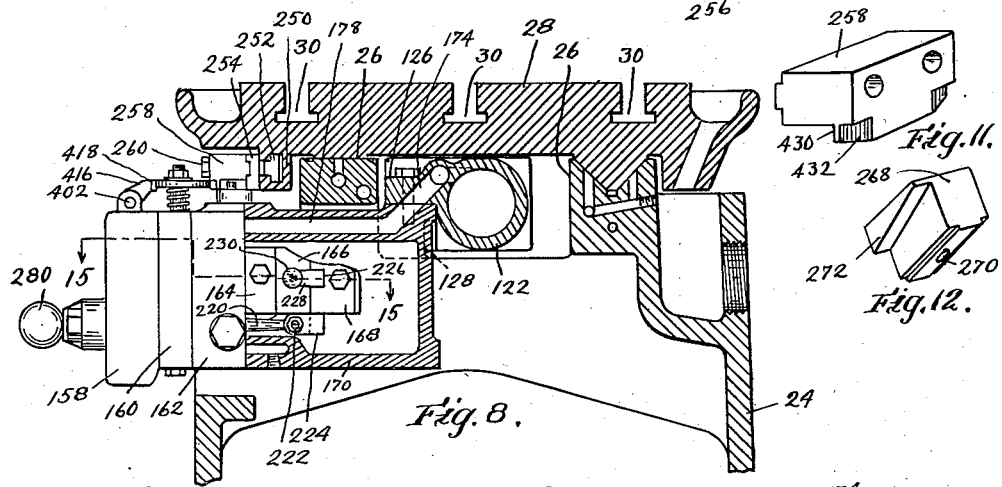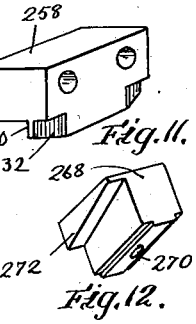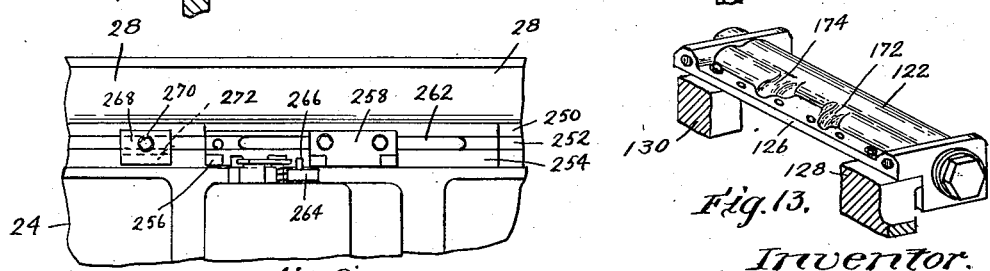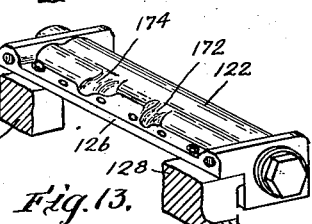

Nov. 21, 1939.   E. J. HIRVONEN   2,181,055
BORING MACHINE
Filed Aug. 31, 1936   5 Sheets-Sheet 4

Inventor,
Eric J. Hirvonen

Nov. 21, 1939.   E. J. HIRVONEN   2,181,055
BORING MACHINE
Filed Aug. 31, 1936   5 Sheets-Sheet 5

Inventor.
Eric J. Hirvonen

Patented Nov. 21, 1939

2,181,055

UNITED STATES PATENT OFFICE 2,181,055

BORING MACHINE

Eric J. Hirvonen, Worcester, Mass., assignor to Leland-Gifford Company, Worcester, Mass., a corporation of Massachusetts Application August 31, 1936, Serial No. 98,683

32 Claims. (Cl. 77—3)

This invention relates to boring machines and particularly to so-called diamond boring machines which are required to have a high degree of accuracy and to produce a smooth finished surface.

In such a machine the spindle which bears the cutter usually is stationarily supported and the work is advanced toward and away from the cutter by a movable carriage which carries the work. One of the objects of the present invention is an improved form of hydraulic mechanism for advancing the carriage smoothly and steadily at a predetermined constant speed in engagement with the cutting tool whereby to produce a true and uniform finished surface that cannot be produced with a variable cutting speed.

A further object of the invention is an improved form of hydraulic mechanism for advancing the work rapidly from a position remote from the cutting tool up to about the point of engagement therewith and thence slowly in cutting engagement with the tool and thence rapidly away from the tool and into a withdrawn position in which it remains until started on a new cycle of operation.

Another object of the invention is the provision of an improved form of hydraulic operating mechanism wherein the work is held momentarily stationary at the end of the cutting stroke and before the work is retracted and wherein the spindle with its cutting tool is stopped from rotation so that the spindle is stationary when the work is retracted in engagement with the cutting tool, thereby to prevent the cutting tool from deleteriously scoring the finished surface of the work.

Another object of the invention is the provision of an improved form of hydraulic mechanism wherein the cutter rotating spindle is normally idle or is not rotating at the time the work, or the work supporting carriage, is in its fully withdrawn or retracted position, with means simultaneously starting the rapid advance of the carriage and the work toward the spindle and the rotation of the spindle.

In a machine of the type in which the present invention is embodied it is highly important to define very accurately the depth that the cutting tool enters the work or the length of the cut. Hereinbefore it has been common to provide the carriage with a cam or the like which is set at some predetermined position with respect to the work to operate mechanism to effect the reversal of the carriage. A cam, however, ordinarily cannot be set sufficiently accurately for precise measurements for one reason because a cam requires a certain amount of movement after it has engaged its cooperating mechanism to effect the operation thereof. Hence it is an object of the present invention to provide an exceptionally accurate and readily adjustable means for defining the depth of the cut.

A yet further object of the invention is the provision of hydraulically operated mechanism for advancing the carriage, the mechanism including a hydraulic piston or cylinder or the equivalent operatively associated with the carriage, and a fixed and unyielding, although preferably adjustable, abutment against which the carriage is advanced and which stops the further advance of the carriage, together with means actuated by the increase of hydraulic pressure in the hydraulic circuit associated with the cylinder caused by the engagement between the carriage and abutment to actuate mechanism to effect the retraction of the carriage.

A yet further object of the invention is the provision of a carriage-stopping abutment the position of which can be adjusted lengthwise of the line of movement of the carriage and can be accurately fixed against movement in any adjusted position, whereby accurately to define the extreme advanced position of the carriage and consequently the depth of engagement between the cutting tool and the work.

Another object of the invention is the provision of a boring machine having mechanism for reciprocating the carriage, means for effecting the reversal of movement of the carriage at the end of the cutting stroke, and means for effecting a suitable period of time delay between the cessation of advance of the carriage and the retraction thereof.

A further object of the invention is the provision of a boring machine wherein the spindle carrying the cutting tool is driven through clutch mechanism from a continuously rotating power source and hydraulic means is provided for controlling the operation of the clutch mechanism in response to the movements of the carriage and particularly for operating the clutch to drive the spindle at the start of advance of the carriage toward the cutter and for causing the clutch to disengage the spindle to stop it from rotation at the termination of advance of the carriage and preferably prior to the retraction of the carriage.

Another object of the invention is the provision of clutch mechanism normally biased to an unoperated or clutch disengaged position and having hydraulic means adapted to be maintained constantly under hydraulic pressure to maintain the clutch mechanism in driving condition.

A further object of the invention is the provision of a hydraulically operated boring machine having clutch mechanism controlling the rotation of the spindle, the clutch mechanism having brake mechanism associated with it for the purpose of rapidly stopping the free rotation of the spindle when the clutch is disengaged, the clutch and brake mechanism being constantly biased for movement to a clutch-disengaged and brake-set condition and being adapted to be held in a clutch-engaged and brake-disengaged condition by hydraulic means.

In some boring operations as, for instance, when boring a hole and for facing or countersinking it is necessary to cut a cylindrical surface and also a more or less radial surface, the radial width of the cut being much greater on the radial face than on the cylindrical face. For the purpose of doing such work it is an object of the present invention to provide the boring machine with hydraulically operated work advancing means and automatically operative mechanism for adjusting the advancing means to advance the work at different cutting speeds, a higher cutting speed for cutting the cylindrical face and a slower cutting speed for cutting the radial face.

Another object of the invention is the provision of hydraulically operated mechanism for a boring machine including a cylinder and piston or the equivalent wherein the slow or cutting speed advance is controlled by regulating the rate at which the hydraulic fluid can escape from the underside of the piston combined with means automatically operated by the position of the carriage or the work with respect to the cutting tool for changing the rate of escape of the hydraulic fluid and preferably for reducing the rate of escape whereby to slow down the cutting feed for cutting radial surfaces.

Another object of the invention is the provision of a boring machine having hydraulically operated mechanism therefor and an improved form of cam mechanism for effecting the changing of speed and the direction of movement of the carriage.

Another object is generally to improve the construction and operation of hydraulically operated machine tools.

Fig. 1 is a front elevation of the boring machine embodying the present invention.

Fig. 2 is an end elevation of the machine of Fig. 1.

Fig. 3 is a longitudinal section of the machine taken along line 3—3 of Fig. 2.

Fig. 4 is a view of the working end of the spindle.

Fig. 5 is a sectional detail taken along line 5—5 of Fig. 3 and illustrating the carriage stop and its adjusting means.

Fig. 6 is a plan view of the carriage stop mechanism of Figs. 3 and 5.

Fig. 7 is a detail illustrating the use of the machine for combined hole boring and countersinking.

Fig. 8 is a section taken along line 8—8 of Fig. 1 and illustrating particularly the disposition of the hydraulic cylinder and valve mechanism.

Fig. 9 is a detail in front elevation of the speed changing cam mechanism.

Fig. 10 is a perspective view of the first slow feed cam of Fig. 9.

Fig. 11 is a perspective view of the second slow feed cam of Fig. 9.

Fig. 12 is a perspective view of the neutral cam.

Fig. 13 is a perspective view of the hydraulic cylinder.

Fig. 14 is a longitudinal sectional elevation of the spindle-driving clutch mechanism.

Figure 15:
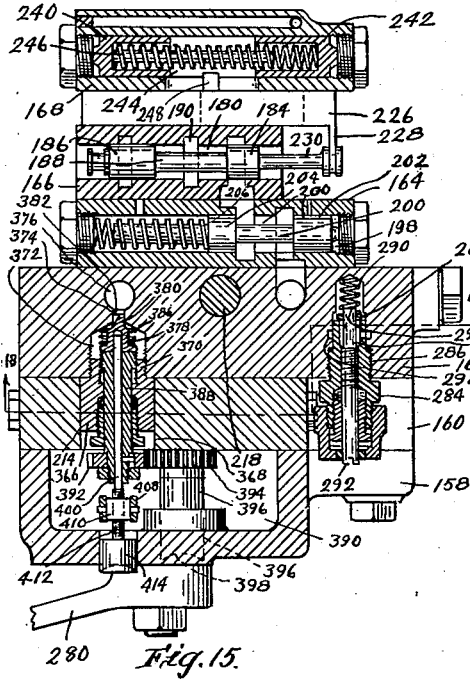
Fig. 15 is a sectional plan view of the hydraulic valve mechanism taken along line 15—15 of Fig. 8.

The boring machine herein illustrated as embodying the present invention comprises a hollow base or pedestal 24 having at the top flat and V-ways 26 on which a work supporting carriage or table 28 is reciprocable. The carriage is provided with suitable T-slots 30, see especially Fig. 8, by which a suitable work supporting fixture 32 can be securely clamped to the table in selected position thereon. The fixture here shown is intended to receive bushings and is provided with a bushing clamping collet 34 that is opened and closed by hydraulic means forming no part of the present invention.

A spindle supporting bridge 36, see Figs. 1, 2 and 3, is carried by and extends transversely over the top of the pedestal at one end of the ways and under which the forward part of the carriage can reciprocate.

The bridge supports a spindle housing 38 which is capable of being secured to the bridge in any desired position lengthwise thereof and transversely of the table by T bolts 40, see Fig. 1, the nuts of which are received in T-slots 42 extending longitudinally in the bridge.

A spindle 44 is journalled in anti-friction bearings 46 in said housing 38 and is driven by a grooved pulley 48 and belts 49 either directly or through an interposed speed reducing countershaft 50, Fig. 1, by a motor 52 through clutch and brake mechanism 54.

The motor and clutch and brake mechanism are disposed within the pedestal 24 and are mounted upon a tank 56 which encloses a hydraulic accumulator, not necessarily shown, and contains a supply of oil or other hydraulic fluid required for the operation of the hydraulic mechanism. The clutch and brake mechanism 54 also includes a hydraulic pump as will be set forth hereinafter in the specific consideration of Fig. 14.

The spindle housing 38 contains a sleeve 58 which surrounds the middle part of the spindle but is slightly spaced therefrom so that there is no engagement between the spindle and sleeve during the normal operation of the spindle. The sleeve, however, acts as a bearing for the spindle in case of a failure of one of the anti-friction bearings so that the spindle will not vibrate unduly before it is stopped from rotating. The sleeve 58 is slidable within the cylindrical bore of the housing and is held in position both against axial and rotational movements by a pin 60 and can be withdrawn from the housing following the withdrawal of the spindle and an anti-friction bearing.

The spindle is provided with a tubular passage 62 therethrough which at the forward end terminates in an outward taper 64 in which a boring bar 66 is seated. The boring bar has a reduced forwardly projecting shank which carries a laterally projecting cutting tool 68 that is adapted to engage with the work carried by the collet 34. The boring bar is held in driving engagement with the spindle by means of a draw bar 70 that passes through the spindle and is threaded into the inner end of the boring bar and has a hand wheel 72 at its outer end that can be drawn against the end of the spindle by the rotation of the draw bar.

The spindle is so arranged that a highly accurate and conveniently obtainable small adjustment of the cutting radius of the cutting tool 68 can be obtained. To this end the axes of the tubular passage 62 and the taper seat 64 in the spindle are eccentric with respect to the axis of the peripheral bearing seats 74 for the antifriction bearings 46, the eccentricity being small and for ordinary purposes not over two thousandths of an inch. The front end face of the spindle, as illustrated in Fig. 4, is provided with a scale 76 graduated in ten-thousandths of an inch and running in both directions from a mid zero position. The boring bar is provided with a witness mark 78 which confronts the scale 76, the witness mark being at right angles to the line of lateral adjustability of the cutting tool 68 in the boring bar. By placing the boring bar in different angular locations in the spindle the radius of the circle that the point of the cutter traverses by the rotation of the spindle will be varied, the maximum variation being four times the eccentricity. Thus the cutting radius of the cutter can be adjusted roughly by a micrometer or the like and the final accurate adjustment quickly made by changing the angular position of the boring bar in the spindle by the aid of the scale 76.

The clutch mechanism for controlling the rotation of the spindle is illustrated particularly in Figs. 1 and 14. The motor 52 is adapted to be continuously rotated. The spindle, however, is intended to be rotated during the forward stroke, or advance, of the work but to be stationary during the time that the work is retracted and at least to be stationary while the work is being retracted from the cutting tool and the cutting tool is in engagement with the work. The rotation of the spindle is controlled by the clutch and brake mechanism 54 which in turn is controlled by mechanism automatically operated by hand and by the work supporting carriage.

The clutch and brake mechanism includes a driving shaft 80 which is continuously rotated by the motor 52 and is suitably supported in antifriction bearings 82 in an end plate 84 of the clutch and brake housing 86. The housing 84 also constitutes a housing for a hydraulic gear pump comprising a driving gear 88 fixed to the shaft 80 and a driving gear 90 fixed to a shaft 92 rotatable in the housing 84. The pump supplies oil or other fluid under pressure to a hydraulic circuit for operating the hydraulically operated parts of the apparatus.

The clutch and brake mechanism also includes a driven shaft 94 supported in an anti-friction bearing 96 carried by a second end plate 98 of the housing 86. The forward end of the shaft 94 is rotatably supported in a pilot bearing 100 carried by a driving clutch member 102 fixed to the end of the driving shaft 80. Said member 102 is in the form of a cylinder and has an internal tapered or conical clutch face 104 which cooperates with a driven cone 106 keyed for rotation with but axially slidable on the driven shaft 94. When the driving and driven conical members 102 and 106 are in engagement it is apparent that the driven shaft rotates conjointly with the driving shaft and when the two conical members are disengaged the driven shaft 94 cannot be rotated by the driving shaft.

It is desirable to stop the rotation of the spindle quickly when the clutch mechanism is disengaged and for this purpose brake mechanism is provided to check the rotation of the spindle. The brake mechanism comprises a conical member 108 which can be identical with the conical clutch member 106 and is keyed for conjoint rotation with and axial movement on the driven shaft 94. Said brake member cooperates with the conical internal face 110 of a brake ring 112 formed integrally with the end flange 98. The arrangement is such that movement of the members 106 and 108 in one direction or toward the right, Fig. 14, effects the driving of the driven shaft 94 and the movement in the opposite direction arrests the rotation of the driven shaft.

The clutch and brake mechanism are normally biased to hold the clutch disengaged and the brake engaged. Movement of the movable clutch and brake mechanism is effected through a pivoted yoke 114 which is constantly urged by a spring 116 for movement in a brake setting and clutch disengaged position. The yoke 114 is moved in the opposite direction to release the brake and set the clutch by a hydraulically actuated piston 118 which operates in a cylinder 120 formed in the end plate 98 and bears against the yoke 114. When sufficiently high fluid pressure is applied to the cylinder 120 the piston 118 overcomes the force of the spring 116 and effects the disengagement of the brake and the engagement of the clutch mechanism. When the hydraulic pressure is released the spring automatically disengages the clutch and sets the brake mechanism and thus rapidly checks the rotation of the spindle.

The carriage 28 is reciprocated by means including a cylinder 122 and a piston 124 therein, see Figs. 3, 8 and 13. Said cylinder is carried by the pedestal 24 between and parallel with the ways 26 and close under the carriage. The cylinder is provided with a laterally outstanding attaching rib 126 which is about as long as the cylinder and rests at its ends upon bosses 128 and 130 integral with the pedestal, see Figs. 2, 8 and 13. The axis of the cylinder is parallel with the line of movement of the table and the length of the cylinder is such that the stroke of the piston is equal to the maximum stroke of the carriage. The piston 124 is secured to the end of a large diameter piston rod 132, see Fig. 3, the outer end of which is located in a bushing 134 located in the depending ear 136 of a bracket 138 fixed to the under side of the carriage. The bushing 134 is free for a slight amount of lateral movement in the bracket so that a slight amount of misalignment between the piston and carriage can be accommodated without cramping the free movements of either.

The fully advanced position of the carriage is positively defined and the carriage is positively held against advance beyond such position by a rigidly supported abutment carried by the pedestal and which is disposed in position to be engaged by a part of the carriage to limit its advancing movement. Engagement between the carriage and the abutment is also arranged to operate the hydraulic control mechanism to effect the return or retraction movement of the carriage. The abutment comprises a cylindrical rod 140, see Figs. 3, 5 and 6, disposed in line with the piston rod 132 and adapted to be engaged by the end of said rod. Said abutment rod 140 is longitudinally slidable in a split bracket 142 fixed to outstanding lugs 144 integral with the pedestal 24. The abutment rod 140 is provided with rack teth 146 which engage the teeth of a pinion shaft 148 journaled in said bracket 142 and in a wall of the pedestal and provided with a knob 150 at its outer end by which the abutment rod can be moved longitudinally. The knob 150 carries a scale 152 which cooperates with an index mark of a part carried by the pedestal so that the position of the end of the abutment rod can be accurately set. The bracket 142 is clamped fixedly about the rod to secure it in adjusted position by a clamping bolt 154 having a head 156 that is accessible from the outer face of the pedestal.

The flow of oil into and out of the opposite ends of the cylinder 122 is under control of valve mechanism comprising a front or cover plate 158 which is exposed at the front of the machine under the carriage and a stacked and rigidly connected series of valve plates or blocks 160, 162, 164, 166 and 168, having intercommunicating oil passages. The valve mechanism is secured to the front face of and is supported by a valve box 170 which is secured to the under face of and is carried by the longitudinal rib 126 of the cylinder 122 between the supporting lugs 128 and 130 thereof. The rib 126 and the cylinder 122 are provided with oil passages 172 and 174, see especially Figs. 8 and 13, which are open to the opposite ends of the cylinder and the box 170 has registering passages 176 and 178 in its top wall which register with the cylinder passages and communicate with oil passages formed in the valve plate or block 162.

Figure 19:
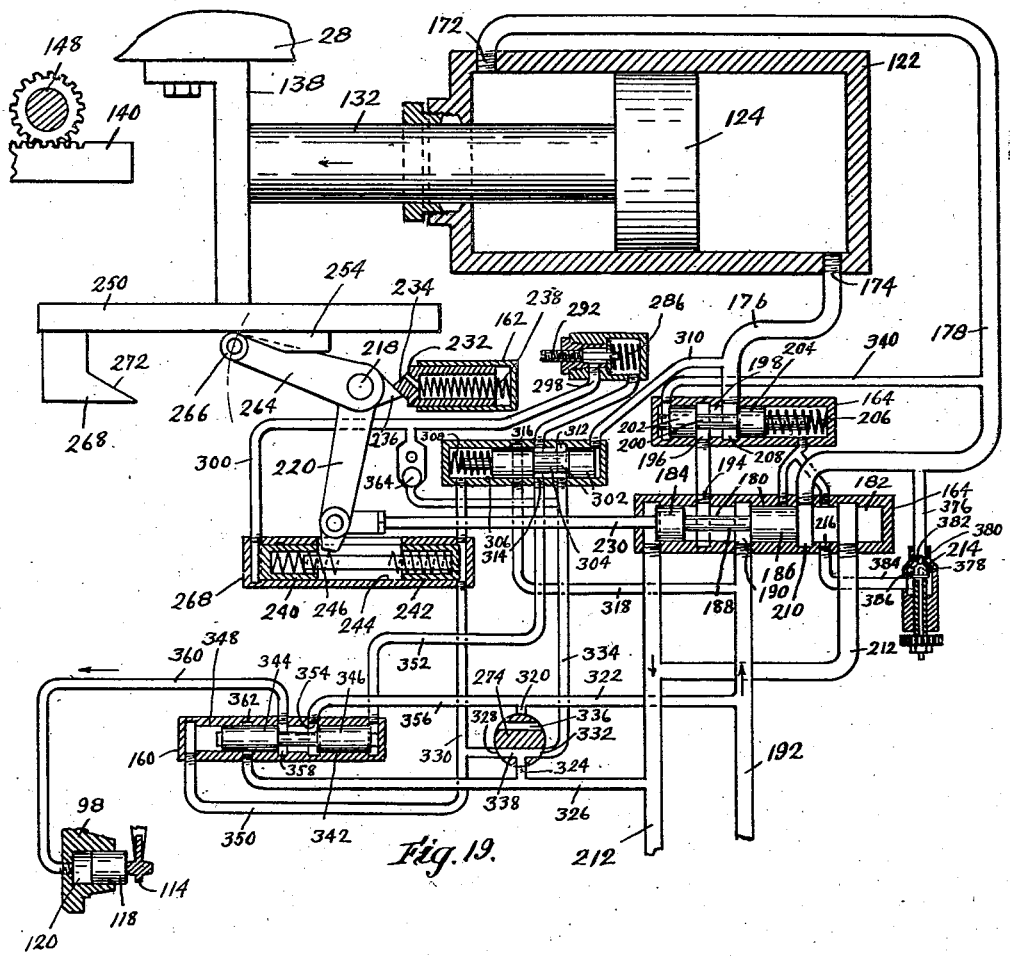
Fig. 19 is a diagrammatic view of a portion of the hydraulic circuit of the machine.

The flow of oil into and out of the cylinder on opposite sides of the piston is controlled by a piston valve 180, see Figs. 15 and 19, operating in a cylinder 182 of the valve plate 166 and having two spaced pistons 184 and 186 connected by the stem 188. The cylinder is provided with an entrance port 190 for high pressure oil supplied under constant pressure through a pipe 192 of the hydraulic circuit, Fig. 19, from the source of oil pressure located in the pedestal. The cylinder is also provided with a port 194 which communicates with a port 196 in a cylinder 198 in the valve block 164 and having a free slow-speed-governing piston valve 200 therein provided with spaced pistons 202 and 204, the piston valves being urged constantly for movement in one direction by a spring 206. Said cylinder 198 has a second port 208 which communicates with the oil passages 176 and 174 to the back or right hand end of the operating cylinder 122. The valve cylinder 182 also has a port 210 communicating through the oil passages 178 and 172 with the forward or left hand end of the operating cylinder 122.

The piston valve 180 controls the direction of movement of the carriage and also the rate of fast and slow speed advance of the carriage. In Fig. 19 the position of the valve 180 is such as to secure high speed advance of the carriage. When the valve is moved to the right to such an amount that the piston 184 partially throttles the port 194 and the piston 186 closes the port 210 the rate of oil flow into the cylinder is restricted and the free escape of oil from the front or left hand side of the cylinder is checked, although not entirely prevented, and the piston consequently advances at slow speed. When the piston 184 is in its furthermost right hand position so that it is disposed between the ports 190 and 194 and the piston 186 is at the right hand end of the port 210 oil can flow freely into the left hand end of the operating cylinder and effect rapid retraction of the carriage. The oil in the rear end of the cylinder can escape freely through the end of the valve cylinder 182, shown in Fig. 19 as connected to an exhaust or waste pipe 212. When the operating piston is advancing at a slow or cutting speed and the port 210 which controls the free flow of oil from the left hand end of the cylinder is closed the oil can escape from the left hand end of the cylinder at a suitably adjusted slow rate through a speed controlling by-pass valve 214 which is connected to the duct 178 and to a port 216 of the valve cylinder 182, which port is freely open to the exhaust passage 212 at the slow speed advance setting of the control valve. The valve 214 by-passes the main valve 180 and serves to govern the rate of slow feed advance of the operating piston and in conjunction with the valve 200 serves to maintain a constant rate of slow speed advance irrespective of variable resistance offered to the advance by the engagement of the tool and the work, as is fully explained in my copending application Serial No. 636,855, filed October 8, 1932, now Patent No. 2,073,518, issued March 9, 1937. The construction of the valve 214 will be more specifically described hereinafter.

The movements of the main control valve 180 are controlled by an operating shaft 218 journalled vertically in the valve plate 162. Said shaft at its lower end has a laterally extended arm 220 fixed thereto, Figs. 8, 16 and 19, the free end of which arm is located between the confronting ends of and is adapted to engage with opposing screws 222, Fig. 16, carried by a downward extension 224 of a slide bar 226 that is located between the valve plates 166 and 168 and is free for horizontal sliding movement therebetween under control of said arm 220 and shaft 218.

Said slide bar has a forwardly directed extension 228 which engages a stem 230 of the control valve 180 so that the angular position of said shaft and arm determines the setting of said control valve.

The control valve is intended to be moved into successively displaced positions corresponding to fast advance of the carriage, slow advance of the carriage, a neutral position where the carriage is held stationary, and a reverse position where the carriage is retracted rapidly away from the work.

Resilient means are provided to move the control shaft and valve rapidly toward fast advance positions and also toward reverse position. Said means includes a plunger 232 having a V-shaped cam end 234 engageable with a corresponding V-shaped cam 236 fixed to the shaft 218, the plunger being slidable in the cam block 162 and constantly urged by a compression spring 238 into engagement with the cam 236. The arrangement is such that the cam projection 234 engages one face of the cam 236 in the fast and slow advance positions of the shaft and cam and thereby tends to rotate the shaft in one direction which is a fast advance direction and engages the other face of the cam 236 when the shaft is in a neutral or reverse position, thereby tending to rotate the shaft in an opposite direction toward a full reverse position. In the neutral position the points of the cams 234 and 236 are close to alignment although the plunger 232 nevertheless presses on the cam 236 in a direction tending to rotate the cam and the shaft from neutral to reverse position.

The control shaft 218 can be moved across neutral position into advance or retraction positions by hydraulic means that include the opposing pistons 240 and 242 operating in a cylinder 244 of the block 168 and normally urged apart or into the opposite ends of the cylinder by an interposed compression spring 246. The slide bar 226 has a projection 248 which is disposed between the pistons and is adapted to be engaged by either one thereof when oil under pressure is admitted to either end of the cylinder so as to move the slide bar 226 and the connected mechanism from one position to another.

The control shaft 218 and the control valve 180 are also set in various positions by cam mechanism carried by the carriage 28. For this purpose the carriage is provided with a depending longitudinally extended rib 250, see Figs. 1, 2, 8 and 9, which rib is provided in its side wall with a T-slot 252 by means of which the cams can be secured to the rib in suitably longitudinally adjusted positions. A slow speed flat cam plate 254 is located on the outer face of the rib and at its forward end has an inclined or cam face 256, see also Fig. 10. A slower speed cam block 258 is disposed upon the outer face of said cam plate and has bolts 260 that pass through longitudinal slots 262 of the cam plate and screw into T-nuts located in the slot of the rib 250, thereby securing both the cam block 258 and the cam plate 254 to the rib. By this arrangement the relative positions of the cam plate and cam block with respect to each other and also with respect to the carriage can be adjusted.

The operating shaft 218 at its upper end and above the valve block 162 and in front of the rib 250 has an operating arm 264 fixed thereto. At the end of the arm is an upstanding pin 266 which can be engaged with the front face of the rib 250 and also the cam plate 254. When the pin is engaged with the rib 250 the control valve 180 is set for the fast advance of the carriage. When the distance of advance of the carriage is sufficient to move the slow speed cam plate 254 under the pin and thereby to displace the pin angularly the valve mechanism is set for slow speed advance.

A neutral cam block 268 is secured to the rib 250 in longitudinally adjusted position thereon by a clamping bolt 270 and has a depending cam part 272, see Fig. 12, that engages the pin 266 at the end part of the retracting movement of the carriage to move the pin and the control shaft and valve from a reverse position to a neutral position where the parts are held by the cam until the pin and control arm are again moved to full advanced position by other means.

The movement of the pin and operating shaft and control valve from a slow speed advance position into a reverse position is accomplished by mechanism responsive to the increase of hydraulic pressure in the operating cylinder 122 caused by the piston 124 thereof coming into engagement with the fixed abutment 140, as will be explained hereinafter.

Figure 17:
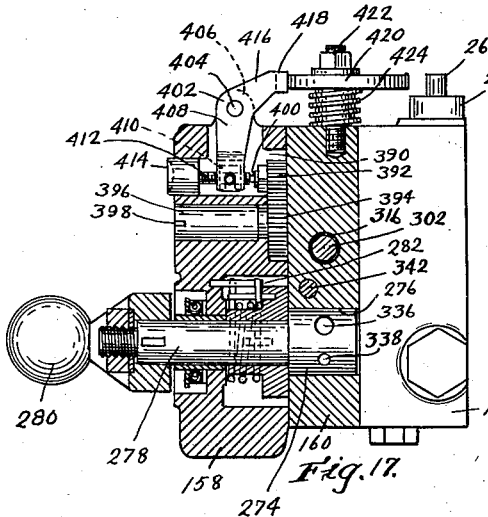
Fig. 17 is a section taken along line 17—17 of Fig. 16.
Figure 18:
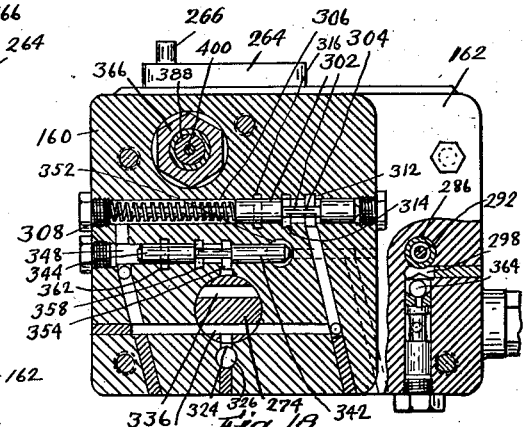
Fig. 18 is a section taken along line 18—18 of Fig. 15.

The manual control of the mechanism is accomplished by a plug valve 274 operating in a cylinder 276 of the valve plate 160, see Figs. 17, 18 and 19, and having a stem 278 that projects forwardly through the valve cover 158 and has a handle 280 fixed thereto. The valve is normally held in a mid or neutral position by appropriate mechanism 282 and is adapted to be moved momentarily from the neutral position in one direction, or counter-clockwise, to start the advance of the carriage from a fully retracted position and to be moved momentarily from the neutral position in the opposite or clockwise direction to effect the retraction of the carriage from any advanced position thereof into fully retracted position.

As before mentioned the carriage is maintained momentarily stationary at the end of its fully advanced position for a period of time sufficient to permit the rotation of the spindle to be stopped so that when the carriage is retracted and the work is redrawn over the cutting tool the tool is stationary. Time delay valve mechanism is provided to secure this result. The valve mechanism is illustrated in Figs. 15 and 19, and comprises a bushing 284 screw-threaded in a passage 286 of the valve block 162. A valve disc 288 is held yieldingly in an oil tight manner against the inner end of the bushing by a spring 290. A valve stem 292 is screw-threaded in the bushing and has its inner end located loosely in an aperture in said valve disc. The inner end of said valve stem is provided with a tapered metering notch 294 so that fluid can pass through the valve disc into the bushing chamber 296 surrounding the valve stem in an amount depending upon the setting of the valve stem in said disc. The chamber 296 communicates with a port 298 and through this port with a duct 300 which admits oil to the reversing piston 240 of Fig. 19.

The end of the chamber 286 receives high pressure oil under control of pressure operated valve means 302, Figs. 18 and 19. Said valve means is arranged to admit high pressure oil to the time delay valve and through this valve to the reversing piston 240 when the pressure in the main operating cylinder 122 rises because of the engagement of its piston with the fixed abutment. Said valve means 302 comprises a double piston valve 304 operating in a cylinder 306 of the valve plate 160 and urged constantly toward one end of the cylinder by a compression spring 308. A duct 310 conveys fluid from the duct 176 that is in communication with the working end of the operating cylinder to the end of the piston valve opposite the spring so that the valve is caused to move toward the left or spring end of its cylinder upon sufficient increase of pressure. The valve cylinder is provided with ports 312, 314 and 316, the ports 314 and 312 being normally in communication and the port 312 being closed and the ports 314 and 316 being in communication when the valve is operated by increased pressure. The port 316 is connected through a duct 318 with the high pressure duct 192. When said ports are in communication oil can flow through the time delay valve into the cylinder behind the reversing piston 240.

The manually operated plug valve 274 has a port 320 connected with a duct 322 containing fluid at high pressure and another port 324 opening into an exhaust duct 326. The valve also has a port 328 communicating with a duct 330 that opens into the cylinder behind the advance piston 242 and a second duct 332 that communicates with the duct 334 opening into the duct 312 of the pressure responsive reversing valve 302. The valve plug has an upper passage 336 therethrough which in the neutral position of the valve is not in communication with any port. When the valve is rotated in a counter-clockwise direction for starting a cycle of operations the passage is in communication with the ports 320, 328. When the valve is moved in the opposite direction from neutral to return the carriage to the normal retracted position from any advance position thereof, the passage 336 is placed in communication with the ports 320, 332. The valve plug also has a lower passage 338 that in the neutral position is in communication with the ports 328, 332, 324, to exhaust the oil from the parts connected with these ports and in any operated position is out of register with any two of the ports so that the passage thus is operative only in the neutral position of the valve.

The operation of the system as thus described is essentially as follows: The normal position of the carriage is in its fully retracted position with the main control valve 180 in a neutral position blocking off the ports 210 and 216 so that oil cannot escape from the advancing side of the operating cylinder 122 and blocking off the port 194 so that oil cannot flow into the trailing or working side of the cylinder. The operating piston 124 is thereby locked hydraulically in fully retracted position. With this position of the valve the cam face 272 of the neutral cam block 268 is in engagement with the pin 266 of the arm 264 of the operating shaft 268 and holds it in the neutral position.

To start the advance of the carriage the handle 280 of the plug valve 274 is depressed momentarily to rotate the valve plug in a counter-clockwise direction. The ports 320 and 328 are thus placed in communication and high pressure oil flows from the duct 192 through the duct 322 and said ports into the duct 330 and thence into the cylinder 244 behind the advance piston 242 and forces this piston toward the left into engagement with the projection 248 forming a part of the operating shaft 218. Such engagement swings said shaft in a clockwise direction, thereby moving the pin 266 against the front face of the rib 250 of the carriage under the neutral cam face 272 and in front of the slow feed cam 254 and consequently moves the control valve 180 into the position illustrated in Fig. 19.

High pressure oil is now free to flow from the duct 192 through the ports 190, 194 into the speed governing valve cylinder 198 and from said cylinder through the ducts 176, 174 into the rear end of the operating cylinder 122. The piston and the carriage thus advance at a maximum speed since the out flow of oil from the cylinder through the ducts 172, 176 is unimpeded, the port 210 of the main valve being freely open to exhaust.

Movement of the carriage in front of the pin 266 advances the front end of the slow speed cam plate 254 toward the pin and ultimately carries the plate behind the pin and moves the pin forwardly and the operating shaft 218 in a counter-clockwise direction and sets the control valve 180 into slow speed position. The amount of high speed advance can be adjusted by moving the slow speed cam plate 254 forwardly or rearwardly. In the slow speed advance position of the valve 180 the port 194 is partially obstructed and the port 210 is closed. Escape of oil from the front end of the cylinder is thus caused to flow through the by-pass valve 214 which can be regulated to vary the rate of flow of oil therethrough and hence the rate of slow speed advance of the carriage. The speed governing valve 200 at its end opposite the spring 206 is connected through a duct 340 to the duct 178 and hence the piston is responsive in position to the back pressure oil and moves to control the input of oil to the working side of the operating cylinder to maintain a constant rate of slow speed advance of the carriage as determined by the setting of the by-pass valve 214 irrespective of variations in resistance to the advance of the carriage. The precise mode of operation of the governing valve is not of particular consequence herein and is fully described in my above referred to copending application.

The setting of the slow speed cam plate 254 on the carriage is adapted to be such that it causes the carriage to reduce its speed at some suitable point prior to the engagement between the tool and the work so that the work is advanced at slow speed in engagement with the cutting tool. The carriage continues to advance at cutting speed, although its speed may again be reduced as will be seen hereinafter, until the piston rod 132 of the carriage comes up against the fixed abutment 140. The carriage thus cannot advance further.

The resistance to the further advance of the carriage causes a reduction of pressure of oil in the forward end of the operating cylinder 122 so that the pressure on the end of the speed governing valve is reduced and the valve moves toward the left and admits full pressure oil into the operating side of the cylinder. The pressure of this oil is transmitted through the duct 310 to the right hand end of the reversing valve 302 and moves it against the pressure of its spring 308 toward the left, thereby closing port 312 and placing ports 314 and 316 in communication. High pressure oil thus is caused to flow from the duct 318 and through the time delay valve 286 into the cylinder 244 and behind the reversing piston 240. Said piston ultimately moves toward the right and engages the projection 248 associated with the operating shaft 218 and swings said pin toward the right and rotates the shaft 218 in a counter-clockwise direction and thus moves the main control valve 180 into reverse position to effect the retraction of the carriage.

The retraction of the carriage, however, does not follow immediately. The setting of the time delay valve 292 is such as to restrict the flow of oil therethrough so that a suitable period of time intervenes between the stopping of the carriage and the filling of the cylinder 244 behind the piston 240 sufficiently to move said piston to effect the reversal of the main control valve. This period of time between the stopping of the carriage and the beginning of the retraction movement of the carriage is utilized to effect the stopping of the spindle as will be described shortly.

When the main valve 180 is in reverse position the port 194 is freely open to the exhaust passage 212 and the port 210 is freely open to the high pressure port 190 so that high pressure fluid flows into the front end of the cylinder to retract the piston and the oil in the rear end of the cylinder flows freely to exhaust.

The stopping of the spindle from rotation is effected by means including a valve 342, see Figs. 18 and 19, located in the valve plate 160 and comprising the connected pistons 344 and 346 operating in a cylinder 348 of said valve plate 160. The left hand end of said cylinder is connected through a duct 350 with the duct 330 and through said latter duct with the cylinder 244 behind the advance piston 242 and with the cylinder 308 of the pressure responsive valve 302 on that side of the piston containing the spring 308, and also with the port 328 of the plug valve 274. The other end of the cylinder 348 is connected through a duct 352 with the port 314 of the pressure responsive valve 302. The cylinder 348 is also provided with a port 354 communicating through a duct 356 with the pressure inlet duct 192. The cylinder also has a duct 358 communicating with a duct 360 that leads to the cylinder 120 of the clutch and brake mechanism 54 which cylinder contains the piston 118 that actuates the spring pressed yoke 114 in a direction to disengage the brake and set the clutch and when the cylinder is free from oil under pressure to permit the spring to operate to move the yoke in the opposite direction to set the brake and disengage the clutch.

The cylinder 348 is provided with a third port 362 which is in communication with the exhaust duct 326. The valve 342 is a free valve and will remain in whichever end of the cylinder it has been moved during one operation until moved in the opposite direction by a following operation.

The arrangement is such that when the pressure responsive valve 302 is moved to the left in response to increase of pressure thereon due to the engagement between the carriage and the fixed abutment, pressure is admitted to the right hand end of the valve cylinder 348 through the duct 352 and the ports 314 and 316 of the pressure responsive valve of the duct 318. This admission of oil to the valve takes place simultaneously with the start of flow of oil through the time delay valve 292. In response to the pressure on the valve 342 the valve moves to its extreme left hand position and closes the port 354 from communication with the port 358 and opens the port 358 to the port 362 and hence to the exhaust. The clutch operating cylinder 120 is thus cut off from communication of the high pressure oil supply and is connected to the exhaust. Consequently the cylinder 118 cannot hold the yoke in clutch engaged position against the action of the spring 116, Fig. 14, and hence the spring is effective to disengage the clutch and set the brake and cause the spindle to stop rotating. The time delay valve 292 is so adjusted that the spindle has stopped rotating before sufficient oil has been admitted behind the reverse piston 240 to effect the reversing of the valve mechanism. The piston 240 is ultimately operated, however, and the carriage is then retracted at high speed.

The movement of the plug valve 274 in a clockwise direction from its neutral position secures the retraction of the carriage at any advanced position thereof. When the plug valve is moved into its extreme clockwise position the plug passage 336 connects the ports 320 and 332 thereby admitting full pressure of oil from the duct 322 into the duct 334 and through the free opening check valve 364 to the cylinder 244 behind the reversing piston 240 and effects the immediate operation of said piston to reverse the carriage without passing the oil through the time delay valve 292. The check valve 364 is closed, however, when oil is passing through the time delay valve. At the same time that oil flows through the check valve 364 to effect the reversal of the carriage high pressure oil also flows through the ports 312 and 314 of the pressure responsive valve 302 into the duct 352 and into the right hand end of the cylinder 348 to actuate the valve 342 and effect the stopping of the spindle.

The movement of the plug valve 274 in a downward or counter-clockwise direction from its neutral position to initiate the advance of the carriage also moves the valve 342 to the right by admitting pressure fluid through the duct 322, the ports 320, 328 and the ducts 330 and 350 to the left hand end of the valve cylinder 348 so that oil is admitted to the clutch actuated cylinder 320 and its piston 318 to effect the engagement of the clutch mechanism and the rotation of the spindle.

It might be here stated that one of the purposes of the valve disc 288, Figs. 15 and 19, of the time delay valve 292 is to permit the rapid expulsion of oil from behind the reversing piston 240. Said piston is constantly urged for movement toward the left, Fig. 19, by the spring 246. Thus the oil behind the piston is under the pressure caused by the spring when the chamber 286 of the by-pass valve is connected to exhaust. Due to the pressure the valve disc 288 can move away from the end of the bushing 284 and hence uncover a greater area of the metering slot 294 to permit the rapid expulsion of oil. This movement of the valve disc also effectively keeps the valve clear of any dirt that might otherwise lodge therein and thus keeps the valve in proper operating condition.

There are many boring operations that include a facing operation in addition to a straight forward boring operation. In Fig. 7 is illustrated a work piece A having a bored hole B and a radial face C. For work of this nature the boring bar 66 in addition to being provided with the cutter 68 for boring the hole B is also provided with a second cutter 68a for machining the face C. The face C usually is considerably broader than the depth of cut made by the cutter 68 and hence ought not to be advanced into the work so rapidly as the cutter 68. For conditioning the machine to perform work of this nature means are provided to advance the carriage during an appropriate part of its working stroke at a slower speed than is determined by the slow speed cam plate 254 and the normal setting of the by-pass valve 214.

Said means includes mechanism, set into operation by the arrival of the carriage at a predetermined position, to change the effective setting of the by-pass valve.

The construction of the by-pass valve 214 is particularly illustrated in Fig. 15. The valve 214 comprises a bushing 366 having a hexagonal part located in a passage 368 of the valve plate 160 and having a screw-threaded part 370 that is screwed into a passage 372 of the valve plate 162. At the bottom of said passage 372 and aligned therewith is a cylindrical valve passage 374 that communicates with a duct 376 opening into the duct 178 that communicates with the forward end of the operating cylinder 122. A valve 378 is located in the passage 372 and has a stem 380 axially movable in the passage 372. The stem 380 is provided with a tapered metering slot 382 so that the position of said slot with respect to said passage 372 determines the rate of flow of oil therethrough. The passage 372 is in communication with a duct 384, Fig. 19, opening into the port 216 of the main control valve 180.

The valve 378 is constantly biased for movement to an open position by a compression spring 386 that surrounds the valve and normally holds the valve seated against the inner end of a sleeve 388 that is screw-threaded in the bushing 370 and extends forwardly into the chamber 390 of the cover plate 158 where it has a pinion gear 392 fixed thereto. Said gear 392 is in mesh with a pinion gear 394 fixed to a shaft 396 that is journalled in the cover plate 158 and has a slot 398 in the front end thereof that is accessible so that the shaft and the gears can be rotated. Manual rotation of the sleeve 388 serves to change the position of the valve 378 thereby to vary the rate of the normal slow speed advance of the carriage, suitable for boring.

Said valve 378 is movable inwardly independently of the adjustment of the sleeve 388 in response to the position of the carriage, thereby to further throttle the escape of oil from the front end of the operating cylinder to obtain a second and slower advance of the carriage, suitable for facing. To this end the sleeve 388 is provided with a pin 400 which is axially slidable in the sleeve into engagement with the valve 378 to move it in a further throttling direction.

Figure 16:
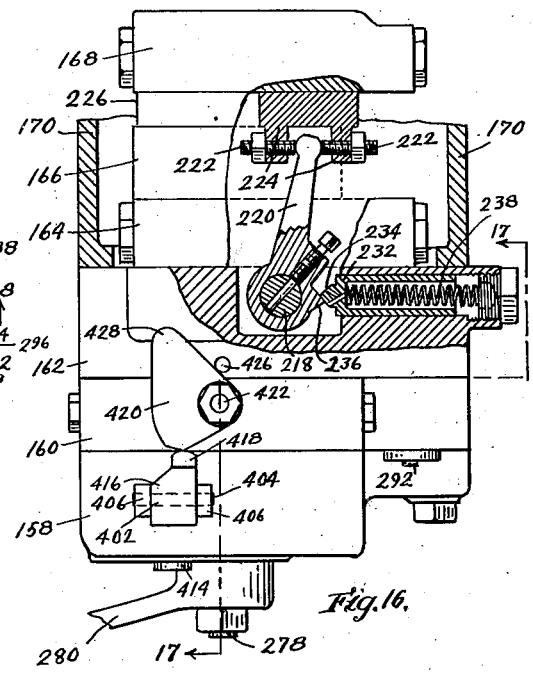
Fig. 16 is a plan view of the mechanism of Fig. 15 partly broken away to illustrate the construction of the cam operated control shaft.

Said pin 400 is actuated by a bell crank lever 402, Figs. 16 and 17, which is pivoted on a pin 404 carried by upstanding ears 406 of the cover plate 158. The lower vertical arm 408 of the bell crank lever is bifurcated and its furcations have between them a block 410 in which an adjusting screw 412 is adjustably screw-threaded in alignment with the pin 400. The screw 412 has an enlarged head 414 which has a bearing in the cover plate 158 and has a slot in the exposed end thereof by which the screw can be rotated manually to vary the adjustment of the slowest feed rate. It is apparent that the bell crank lever when rotated in a counter-clockwise direction moves the screw 412 into engagement with the pin 400 and advances the pin to thereby advance the valve 378 in a more throttling position than is determined by the setting of the sleeve 388.

The bell crank lever has an upper horizontal arm 416 terminated in a cam end 418 that is engaged with a cam plate 420 pivoted on a stud 422 upstanding from the valve plate 160 and engaged with a spring 424 which tends to rotate the cam plate in a clockwise direction and thereby maintain it yieldingly against a stop pin 426 upstanding from the valve plate 162. The inner end or nose 428 of said valve plate is disposed in position to be engaged by the slowest speed cam block 258, Figs. 8, 9 and 11, that overlies the slow speed cam plate 254. Said cam block 258 projects forwardly above the pin 266 of the operating arm 264 of the shaft 218 to permit the swinging of said pin and arm between fast advance and reverse positions. Said cam block 258 at the front part thereof has a depending rib 430 that at its front or advancing part is formed with an inclined face 432 which moves under the nose 428 of the cam plate 420 during the advance of the carriage and thereby causes the further throttling of the by-pass valve 214 so as to effect the further advance of the carriage at the slowest speed. The position of the cam block 258 is adjustable lengthwise of the carriage so that it can readily be secured in position to effect the change of speed when the work and the cutter are in the proper relation. When the cam block 258 is not in engagement with the cam plate 420, as when the carriage is being retracted, the spring 386 of the by-pass valve 378 moves said valve automatically into a more open position as determined by the setting of the sleeve 388.

I claim:

1. A boring machine comprising a fixed spindle housing, a tool-carrying spindle rotatable in said housing and fixed against axial movement therein, a work supporting carriage movable toward and away from said spindle, hydraulic means for reciprocating said carriage toward and away from said spindle, a fixed abutment disposed in the path of advancing movement of said carriage for limiting the advance thereof, means including timing mechanism responsive to the engagement between said carriage and said abutment for effecting the delayed retraction of said carriage away from said spindle and said abutment, and means for stopping the rotation of said spindle during the delay of the retraction of said carriage.

2. A boring machine comprising a machine frame having a front wall, a spindle-carrying bridge on said frame, a rotatable tool-carrying spindle carried by said bridge, a work supporting carriage on said frame movable toward and away from said spindle, means for advancing and retracting said carriage toward and away from said spindle, an adjustable abutment disposed back of said frame front wall in the path of advancing movement of said carriage and adapted to be engaged thereby to hold said carriage from further advancing movement, means responsive to the engagement between said abutment and carriage for effecting the retraction of said carriage away from said abutment and spindle, means for adjusting the position of said abutment lengthwise of the path of movement of said carriage comprising a rod having a driving connection with said abutment for changing its position, said rod having an extension projected through said frame front wall, a rod rotating and position indicating member carried by said rod in front of said front wall, and means for securing said abutment fixedly in adjusted position, said means having a part extended through said front wall and said part having rotating means located in front of said wall.

3. A boring machine comprising a rotatable tool-carrying spindle, a movable work supporting carriage, hydraulic means for advancing and retracting said carriage toward and away from said spindle, a fixed abutment disposed in the path of advance of said carriage and arranged to be engaged thereby to limit the advancing movement of said carriage, means including a hydraulic circuit for supplying said hydraulic means with operating fluid, means including hydraulic timing mechanism, responsive to an increase of fluid pressure in said circuit in response to the engagement between said carriage and abutment for delaying the supply of fluid to said hydraulic means for effecting the delayed retraction of said carriage and means to stop the rotation of said spindle during such delay of the retraction of said carriage.

4. A boring machine comprising a stationarily-supported rotatable tool-carrying spindle, a movable work supporting carriage, means for advancing and retracting said carriage toward and away from said spindle including a hydraulically operated cylinder and piston, a fixed abutment disposed in the path of advance of said carriage and arranged to be engaged by said carriage for retracting the advance thereof, a hydraulic circuit for supplying said cylinder and piston with operating fluid, valve means controlling the flow of fluid between said circuit and said cylinder, means responsive to the engagement between said carriage and abutment for increasing the pressure of said fluid in a part of said circuit, means including timing mechanism responsive to the increase of fluid pressure for effecting the delayed operation of said valve means to secure the delayed retraction of said carriage, and means to stop the rotation of said spindle during such delay of the retraction of said carriage.

5. A boring machine comprising a rotatable tool-carrying spindle, a movable work supporting carriage, means for advancing and retracting said carriage toward and away from said spindle including a cylinder and a piston therein, a hydraulic circuit for supplying said cylinder with operating fluid, valve means for admitting fluid into said cylinder on one side of said piston for effecting the advance of said carriage, means for restricting the escape of fluid from said cylinder on the other side of said piston, means responsive to differences of pressure of fluid on said other side of said piston for increasing and decreasing the pressure on said first side of said piston, an abutment disposed in the path of advance of said carriage and arranged to be engaged thereby for limiting the advance thereof, and means responsive to the increase of pressure on said first side of said piston in response to the reduction of pressure on the other side of the piston occasioned by the engagement between said carriage and abuutment for effecting the retraction of said carriage.

6. A boring machine comprising a rotatable tool-carrying spindle, a movable work carrying carriage, means including a piston and cylinder for advancing and retracting said carriage toward and away from said spindle, an abutment disposed in the path of advance of said carriage and arranged to be engaged thereby to restrict further advance thereof and to create a high fluid pressure in said cylinder, means including a hydraulic circuit for supplying said cylinder with operating fluid, means for admitting fluid to the working side of said piston for effecting the advancing movement of said carriage and for admitting fluid to the back side of said piston for effecting the retraction of said carriage, means for restricting the escape of fluid from the back side of said piston when said piston is advancing, means responsive to a variations of back pressure fluid for increasing the advancing pressure when the back pressure is low and for decreasing the advancing pressure when the back pressure is high, whereby to maintain a uniform rate of advance of the carriage irrespective of variations of working resistance, and means responsive to a predetermined increase of working pressure occasioned by the engagement between said carriage and abutment and the consequent diminution of back pressure for effecting the retraction of said carriage.

7. A boring machine comprising a rotatable tool-carrying spindle, a work support, one of said elements being advanceable and retractable toward and away from said other element, rotating means for said spindle having a disengageable connection therewith, means responsive to the advanced position of said advanceable element for promptly disengaging said connection and stopping the rotation of said spindle and the advance of said advanceable element, and time delay means set in operation in response to the stopping of the advance of said advanceable element for effecting the retraction of said advanceable element only after a predetermined interval of time following the disengagement of said connection.

8. A boring machine comprising a rotatable tool-carrying spindle, a movable work supporting carriage, hydraulic means for advancing and retracting said carriage toward and away from said spindle, driving means for rotating said spindle having a disengageable connection therewith, fluid-operated means controlling said hydraulic means and said disengageable connection for effecting the stopping of said carriage in a predetermined advanced position thereof and for disengaging said connection for stopping the rotation of said spindle, and fluid-flow-controlling time delay means responsive to the stopping of the carriage and operatively effective only after a predetermined interval of time following the disengagement of said disengageable connection for controlling said hydraulic means for effecting the retraction of said carriage.

9. A boring machine comprising a rotatable tool-carrying spindle, a work supporting carriage, means including a hydraulic cylinder and piston for advancing and retracting said carriage toward and away from said spindle, means providing a hydraulic circuit for supplying said cylinder with operating fluid, valve means controlling the supply of fluid to said cylinder to effect the alternate advance and retraction of said carriage, driving means for rotating said spindle having a disengageable connection therewith, means responsive to a predetermined advanced position of said carriage for effecting the disengagement of said disengageable connection and the stopping of said spindle and also for effecting the operation of said valve means to secure the retraction of said carriage, and means for delaying the operation of said valve means to effect the retraction of said carriage for an interval of time following the disengagement of said disengageable connection.

10. A boring machine comprising a rotatable tool-carrying spindle, a work supporting carriage, means including a hydraulic piston and cylinder for advancing and retracting said carriage toward and away from said spindle, valve means controlling the supply of hydraulic fluid to said cylinder for effecting the advance and retraction of said carriage, driving means for rotating said spindle having an operative connection therewith, a clutch mechanism interposed in said operative connection having a hydraulic cylinder and piston for controlling the engagement and disengagement of said clutch mechanism, a hydraulic cylinder and piston for moving said valve means to a position to secure the retracting movement of said carriage, means responsive to a predetermined advanced position of said carriage for admitting hydraulic fluid to the cylinder and piston of said clutch mechanism to effect the disengagement thereof and also to the cylinder and piston of said valve means to move it into a carriage retracting position, and means for delaying such movement of said valve means for an interval of time following the disengagement of said clutch mechanism.

11. A boring machine as defined in claim 10, wherein said time delaying means includes means to delay the admission of hydraulic fluid to the actuating cylinder of said valve means.

12. A boring machine comprising a rotatable tool-carrying spindle, a work supporting carriage, means including a hydraulic cylinder and piston for advancing and retracting said carriage toward and away from said spindle, valve means for controlling the supply of hydraulic fluid to said cylinder for effecting the advance and retraction of said carriage, driving means for rotating said spindle having an operative connection therewith, clutch mechanism interposed in said operative connection, a hydraulic cylinder and piston for controlling said clutch mechanism, a cylinder and piston for controlling said valve means, a hydraulic circuit associated with said pistons, cylinders and valve means, means responsive to a predetermined advanced position of said carriage for connecting said cylinder of said clutch mechanism to said hydraulic circuit to effect the disengagement of said clutch mechanism and also to connect the cylinder of said valve means with said hydraulic circuit to effect the movement of said valve means into a carriage retracting position, and means including timing mechanism interposed between the cylinder of said valve means and said hydraulic circuit for delaying the movement of said valve means into carriage retracting position for a predetermined period of time following the disengagement of said clutch mechanism.

13. A boring machine comprising a rotatable tool-carrying spindle, a work supporting carriage, means including a hydraulically operated cylinder and piston for advancing and retracting said carriage toward and away from said spindle, a hydraulic circuit, valve means controlling the connection of said cylinder with said hydraulic circuit for securing the advance and retraction of said carriage, a fixed abutment disposed in the path of advancing movement of said carriage and arranged to be engaged thereby to define the advanced position thereof, driving means for rotating said spindle having an operative connection therewith, clutch mechanism interposed in said operative connection, a hydraulically operated cylinder and piston for controlling the operation of said clutch mechanism, and means responsive to an increase of pressure in said hydraulic circuit following the engagement of said carriage with said abutment for connecting the hydraulic piston and cylinder of said clutch mechanism with said hydraulic circuit to effect the disengagement of said clutch mechanism and also for effecting the movement of said valve means into carriage retracting position.

14. A boring machine as defined in claim 13, having means to delay the movement of said valve means into carriage retracting position for a period of time following the disengagement of said clutch mechanism.

15. A boring machine comprising a rotatable tool-carrying spindle, a work supporting carriage, means including a hydraulically operated cylinder and piston for advancing and retracting said carriage toward and away from said spindle, a hydraulic circuit, valve means for connecting said cylinder with said circuit and movable into different positions for securing the advance and retraction of said carriage, driving means for rotating said spindle, a fixed abutment disposed in the path of advancing movement of said carriage and arranged to be engaged thereby to define the limit of advancing movement thereof and to set up a high fluid pressure in said hydraulic circuit, means for stopping the rotation of said spindle, means for moving said valve means into carriage retracting position, and means responsive to said high pressure in said hydraulic circuit for effecting the operation of said spindle stopping means and also the movement of said valve means into carriage retracting position following a predetermined time interval after the operation of said spindle-stopping means.

16. A boring machine comprising a rotatable tool-carrying spindle, a work support, means including a hydraulically operated cylinder and piston for effecting advancing and retracting movements of one of the aforesaid elements toward and away from the other element, a hydraulic circuit for said cylinder, a pump supplying said circuit with pressure fluid, valve means controlling the connections between said cylinder and circuit for effecting the advancing and retracting movements of said advanceable and retractable element, means for stopping the rotation of said spindle, and means responsive to a predetermined increase of hydraulic pressure in said circuit occasioned by abnormal resistance of advance of said advanceable and retractable element for controlling said spindle stopping means to effect the stopping of the spindle and also to effect the movement of said valve means into position for securing the retraction of said advanceable and retractable element following a predetermined time interval after the operation of said spindle stopping means.

17. A boring machine comprising a rotatable tool-carrying spindle, a movable work supporting carriage, means including a hydraulically operated cylinder and piston for advancing and retracting said carriage toward and away from said spindle, a hydraulic circuit, a pump for supplying said circuit with pressure fluid, valve means controlling the connections of said cylinder with said circuit for effecting the advance and retraction of said carriage, a hydraulic piston and cylinder for effecting movement of said valve means into carriage retracted position, a fixed abutment disposed in the path of advance of said carriage and arranged to be engaged with said carriage to limit the advancing movement thereof and to set up a high fluid pressure in said hydraulic circuit, driving means for rotating said spindle having an operative connection therewith, a clutch mechanism interposed in said connection, a hydraulic cylinder and piston controlling the operation of said clutch mechanism, means responsive to said high pressure in said hydraulic circuit for admitting fluid for controlling the connection of the cylinder of said clutch mechanism with said hydraulic circuit for effecting disengagement of said clutch mechanism and also for connecting the cylinder of said valve means with said hydraulic circuit for admitting fluid to said cylinder for effecting movement of said valve means into carriage retracting position, and timing means interposed between said circuit and said valve means cylinder for delaying the admission of an effective amount of fluid in said cylinder to operate said valve means for a predetermined interval of time following the disengagement of said clutch mechanism.

18. A boring machine comprising a rotatable tool-carrying spindle, a movable work supporting carriage, means including a hydraulically operated piston and cylinder for advancing and retracting said carriage toward and away from said spindle, a hydraulic circuit, valve means controlling the connections between said circuit and cylinder for securing the advance and retraction of said carriage, a fixed abutment disposed in the path of advance of said carriage for defining its advanced position and for building up a high pressure in said hydraulic circuit, driving means for rotating said spindle having an operative connection therewith, a clutch mechanism interposed in said operative connection having spring means constantly biasing said clutch mechanism for movement into a disengaged position and having a hydraulically operated cylinder and piston holding said clutch mechanism in engaged position against the bias of said spring, a cylinder and piston for moving said valve means into carriage retracting position, means responsive to a predetermined high pressure in said hydraulic circuit for connecting the cylinder of said clutch mechanism to a low pressure portion of said circuit for effecting the disengagement of said clutch mechanism and also for connecting the cylinder of said valve means with a higher pressure portion of said circuit for effecting the ultimate movement of said valve means into a carriage retracting position, and timing means interposed between said hydraulic circuit and said valve means cylinder for delaying the admission of a sufficient amount of fluid to said valve means cylinder to effect the operative movement of said valve means for a predetermined period of time following the disengagement of said clutch mechanism.

19. A boring machine comprising a stationarily supported rotatable tool-carrying spindle, a movable work supporting carriage, means including a hydraulically operated piston and cylinder for advancing and retracting said carriage toward and away from said spindle, a hydraulic circuit, valve means including an operating member controlling the connections between said circuit and said cylinder for securing the advance and retraction of said carriage, a fixed abutment disposed in the path of advancing movement of said carriage and arranged to be engaged thereby to limit the advancing movement thereof, and also to set up a high fluid pressure in said circuit, cam means associated with said carriage for controlling said valve operating member to change the speed of advance of said carriage, and means responsive to said predetermined high pressure in said valve circuit for moving said valve operating member to secure retraction of said carriage.

20. A boring machine comprising a rotatable tool-carrying spindle, a movable work supporting carriage, means including a hydraulically operated cylinder and piston for advancing and retracting said carriage, a hydraulic circuit, valve means including an operating member controlling the connections between said circuit and cylinder for securing fast and slow rates of advancing movement of said carriage and the retraction thereof, manually operated means for effecting movement of said valve means into a position for effecting fast advance of said carriage, cam means associated with said carriage for moving said valve operating member into a position for slowing down the speed of advance of said carriage and for effecting further advance of said carriage at slow speed, a fixed abutment disposed in the path of advance of said carriage and arranged to be engaged thereby for operating said operating member restricting further advance of said carriage and for creating a high pressure in said hydraulic circuit, and means responsive to said high pressure for effecting movement of said valve operating member into a position to secure the retraction of said carriage.

21. A boring machine comprising a rotatable tool-carrying spindle, a movable work supporting carriage, hydraulic means for advancing and retracting said carriage toward and away from said spindle and from and to a fully retracted position, means controlling said hydraulic means for holding said carriage idle in said fully retracted position, means for driving said spindle, manual control means controlling said hydraulic means and said spindle driving means for starting the advance of said carriage and the rotation of said spindle, and means responsive to a predetermined advanced position of said carriage controlling said hydraulic means and said spindle driving means for holding said carriage stationary in its advanced position and for stopping said spindle while said carriage is stationary and for then effecting the subsequent retraction of said carriage.

22. A boring machine comprising a rotatable tool-carrying spindle, a movable work supporting carriage, means including a hydraulically operated piston and cylinder for advancing and retracting said carriage toward and away from said spindle, a hydraulic circuit, valve means controlling the connections between said circuit and cylinder for effecting advance and retraction of said carriage, means for setting said valve means to effect the rapid advance of said carriage towards said spindle, means responsive to a predetermined distance of advance of said carriage for operating said valve means to effect the continued advance of said carriage at a slow cutting speed, and other valve means responsive to a predetermined distance of slow speed advance of said carriage to effect continued advance of the carriage at a still slower cutting feed.

23. A boring machine comprising a rotatable tool-carrying spindle, a movable work supporting carriage, means including a hydraulically operated piston and cylinder for advancing and retracting said carriage toward and away from said spindle, a hydraulic circuit, valve means controlling the connections between said circuit and cylinder for effecting advance and retraction of said carriage, means for setting said valve means to effect the rapid advance of said carriage toward said spindle, means responsive to a predetermined distance of advance of said carriage for operating said valve means to effect the continued advance of said carriage at a slow speed, other valve means responsive to a predetermined distance of slow speed advance of said carriage for further reducing the rate of slow speed advance of the carriage independently of said first valve means, an abutment disposed in the path of advance of said carriage and adapted to be engaged by said carriage to restrict the advancing movement thereof and to set up an increased hydraulic pressure in said circuit, and means responsive to said increased hydraulic pressure to effect the retraction of said carriage.

24. A boring machine comprising a stationarily supported rotatable tool-carrying spindle, a movable work supporting carriage, means including a hydraulic cylinder and piston for advancing and retracting said carriage toward and away from said spindle, a hydraulic circuit, means for admitting fluid from said circuit into said cylinder on one side of said piston for effecting the advancing movement of said carriage, a speed controlling valve through which the fluid from said cylinder on the other side of said piston is constrained to flow during the advance of said carriage for governing the rate of advance thereof, said valve having an adjustable valve member the setting of which determines the rate of flow of fluid through said valve, and means responsive to a predetermined distance of advance of said carriage for changing the setting of said valve member to reduce the speed of further advance of said carriage.

25. A boring machine comprising a stationarily supported rotatable tool-carrying spindle, a movable work supporting carriage, means including a hydraulic cylinder and piston for advancing and retracting said carriage toward and away from said spindle, a hydraulic circuit, means for admitting fluid from said circuit into said cylinder on one side of said piston for effecting the advancing movement of said carriage, a speed controlling valve through which the fluid from said cylinder on the other side of said piston is constrained to flow during the advance of said carriage for governing the rate of advance thereof, said valve having an adjustable valve member the setting of which determines the rate of flow of fluid through said valve, manual means for changing the setting of said valve member to adjust the rate of slow advance, and means responsibe to a predetermined distance of advance of said carriage for changing the setting of said valve member independently of said manually operated means to secure further advance at further reduced speed.

26. A boring machine comprising a stationarily supported rotatable tool-carrying spindle, a movable work supporting carriage, means including a hydraulic cylinder and piston for advancing and retracting said carriage toward and away from said spindle, a hydraulic circuit, means for admitting fluid from said circuit into said cylinder on one side of said piston for effecting the advancing movement of said carriage, a speed controlling valve through which the fluid from said cylinder on the other side of said piston is constrained to flow during the advance of said carriage for governing the rate of advance thereof, manual means for changing the setting of said valve to adjust the rate of slow advance, and means responsive to a predetermined distance of advance of said carriage for changing the setting of said valve independently of said manually operated means to secure further advance of said carriage at further reduced speed, and automatically operative means responsive to the retraction of the carriage for restoring said valve to its original setting.

27. A boring machine comprising a rotatable tool-carrying spindle, a movable work supporting carriage, means including a hydraulically operated cylinder and piston for advancing and retracting said carriage, a hydraulic circuit, valve means controlling the inlet and outlet of operating fluid to and from opposite ends of said cylinder, means for setting said valve means to admit fluid into said cylinder on one side of said piston and to permit the free escape of fluid from said cylinder on the other side of said piston for effecting the rapid advance of said carriage, means for adjusting the setting of said valve to prevent the free escape of fluid from said other end of said cylinder, a valve having a movable valve member for by-passing a part of said valve means for admitting a restricted escape of fluid from said other end of said cylinder for effecting a slow speed advance of said carriage, and means responsive to a predetermined distance of advance of said carriage at slow speed for changing the setting of said by-pass valve member to effect the continued advance of said carriage at a further reduced speed.

28. A boring machine comprising a rotatable tool-carrying spindle, a movable work supporting carriage, means including a hydraulically operated cylinder and piston for advancing and retracting said carriage, a hydraulic circuit, valve means controlling the inlet and outlet of operating fluid to and from opposite ends of said cylinder, means for setting said valve means to admit fluid into said cylinder on one side of said piston and to permit the free escape of fluid from said cylinder on the other side of said piston for effecting the rapid advance of said carriage, means for changing the setting of said valve to prevent the free escape of fluid from said other end of said cylinder, a valve by-passing a part of said valve means for admitting a restricted escape of fluid from said other end of said cylinder for effecting a slow speed advance of said carriage, means responsive to a predetermined distance of advance of said carriage for changing the setting of said by-pass valve to effect the continued advance of said carriage at a further reduced speed, independent manually operated means for adjusting the setting of said by-pass valve to secure the highest slow speed advance of said carriage, and automatically operative means responsive to table retraction to restore said valve to the adjustment of said manually operated means following the change of adjustment thereof by said distance responsive means.

29. In a boring machine having a relatively advanceable and retractable rotatable tool-carrying spindle and work support, hydraulically operated means for relatively advancing and retracting said spindle and work support, a hydraulic circuit, valve means controlling the flow of fluid between said hydraulic means and circuit for governing the rate of relative advance of said spindle and carriage, said valve means including a valve member controlling escape of fluid from said hydraulically operated means and biased for movement into an open position, means for defining said open position, and means responsive to a predetermined distance of relative advance of said spindle and work support for moving said valve member in a closing direction against said biasing means to secure further advance at reduced speed.

30. In a boring machine having a relatively advanceable and retractable rotatable tool-carrying spindle and work support, hydraulically operated means for relatively advancing and retracting said spindle and work support, a hydraulic circuit, valve means controlling the flow of fluid between said hydraulic means and circuit for governing the rate of relative advance of said spindle and carriage, said valve means including a valve member controlling escape of fluid from said hydraulically operated means and biased for movement into an open position, means for defining said open position, and means responsive to a predetermined distance of relative advance of said spindle and work support for moving said valve member in a closing direction independently of said open position defining means to secure further advance at reduced speed.

31. In a boring machine, the combination of a tool-carrying spindle, a work supporting table movable toward and away from said carriage, a hydraulic cylinder and piston associated with said carriage for advancing it toward and retracting it from said spindle, a hydraulic circuit, valve mechanism for admitting pressure fluid alternately in opposite ends of said cylinder for reciprocating said carriage, driving mechanism for said spindle, clutch mechanism for controlling the driving engagement between said driving mechanism and spindle, spring means for normally holding said clutch mechanism in the disengaged condition thereof, means including a hydraulic cylinder and piston for holding said clutch mechanism engaged against the pressure of said spring means, means for normally supplying said cylinder with pressure fluid from said circuit for holding said clutch mechanism engaged, and means responsive to predetermined advanced positions of said carriage operative to relieve said clutch mechanism cylinder of pressure to permit said spring means to operate to disengage said clutch mechanism.

32. In a boring machine, the combination of a tool-carrying spindle, a work supporting carriage movable toward and away from said carriage, a hydraulic cylinder and piston associated with said carriage for advancing it toward and retracting it from said spindle, a hydraulic circuit, valve mechanism for admitting pressure fluid alternately in opposite ends of said cylinder for reciprocating said carriage, driving mechanism for said spindle, clutch mechanism for controlling the driving engagement between said driving mechanism and spindle, spring means for normally holding said clutch mechanism in the disengaged condition thereof, means including a hydraulic cylinder and piston for holding said clutch mechanism engaged against the pressure of said spring means, means for normally supplying said cylinder with pressure fluid from said circuit for holding said clutch mechanism engaged, and means responsive to predetermined advanced positions of said carriage operative to relieve said clutch mechanism cylinder of pressure to permit said spring means to operate to disengage said clutch mechanism, and timing means operable concurrently with said last named means to delay the retraction of said carriage for a period of time sufficient to ensure the stopping of the rotation of said spindle.

ERIC J. HIRVONEN.

CERTIFICATE OF CORRECTION.

Patent No. 2,181,055.                                          November 21, 1939.

ERIC J. HIRVONEN.

It is hereby certified that error appears in the printed specification of the above numbered patent requiring correction as follows: Page 3, second column, line 2, for "wtih" read with; page 4, first column, line 11, for "teth" read teeth; page 7, second column, line 12, for "cluch" read clutch; page 9, first column, line 28, claim 5, for "abuutment" read abutment; line 47, claim 6, strike out "a" before variations; page 12, first column, line 17, claim 25, for "responsibe" read responsive; and that the said Letters Patent should be read with this correction therein that the same may conform to the record of the case in the Patent Office.

Signed and sealed this 26th day of December, A. D. 1939.

(Seal)

Henry Van Arsdale,
Acting Commissioner of Patents.